UNITED STATES PATENT OFFICE.

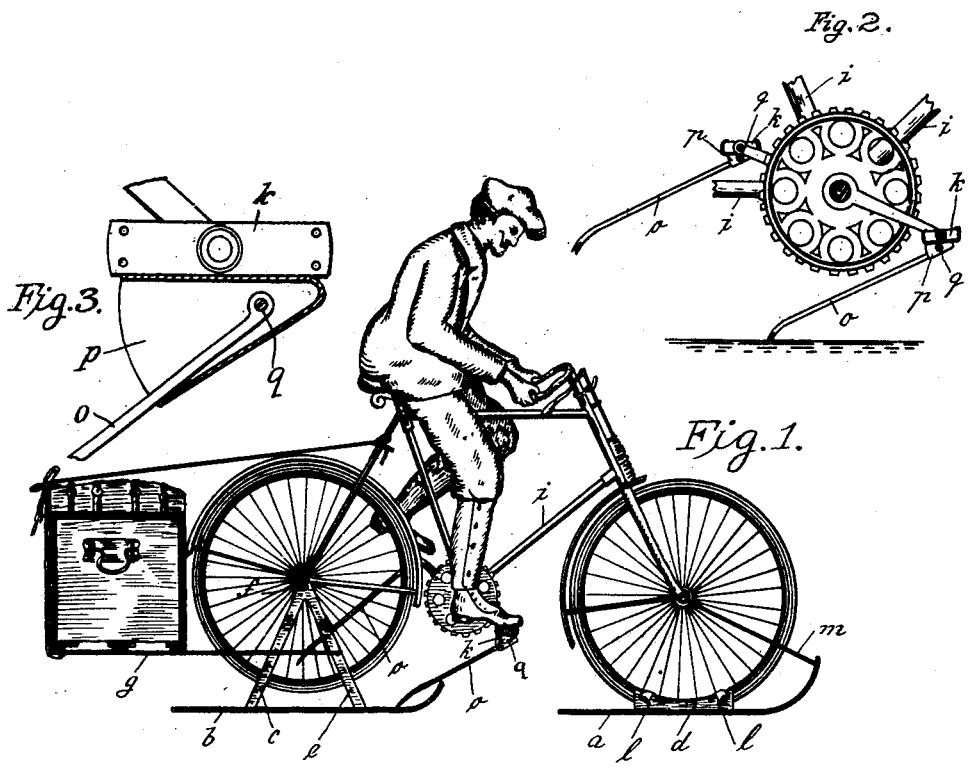

PRODROMOS MADJAROGLOU AND ANDREAS PAULICK, OF DRESDEN, GERMANY.

SLEDGE-VELOCIPEDE.

1,399,138.      Specification of Letters Patent.      Patented Dec. 6, 1921.

Application filed August 16, 1918. Serial No. 250,258.

*To all whom it may concern:*

Be it known that we, PRODROMOS MADJAROGLOU and ANDREAS PAULICK, subjects of the Sultan of Turkey and German Emperor, respectively, and residents of Dresden, Germany, have invented certain new and useful Improvements in Sledge-Velocipedes, of which the following is a specification.

Sledge-velocipedes, which are driven by means of pedal-operated pickers, are already known heretofore. The present invention relates to a sledge-velocipede of such kind, and the novelty consists in locating said pickers turnably in funnel-shaped brackets with open rear end fixed to the underside of the pedals, so that they participate in the circular movement of the latter, the turning-movement of said pickers being limited by the walls of said brackets, while the free ends of said pickers project in rearwardly and downwardly inclined direction from said brackets.

The annexed drawing shows the improvement: Figure 1 is a side-view of a sledge-velocipede fitted with the same, while Fig. 2 shows a detail on a larger scale. Fig. 3 is a vertical longitudinal section through one funnel-shaped bracket.

From an existing bicycle $i$ with pedals $k$, the chain is removed. The sledge-frame comprises one fore-runner $a$ and two rear-runners $b$. The fore-runner $a$ carries a bearing $d$, while on the rear-runners $b$ a support $c$, $e$ is erected. The front-wheel of the bicycle is mounted on the bearing $d$ and firmly fastened thereto by straps $l$. From both ends of the front-wheel axle project rods $m$ to the front end of the fore-runner $a$, to which they are fixed by rivets or the like. The back-wheel is supported on inwardly projecting hooks $f$ of the support $c$, $e$, to which it may be secured by straps or the like. The height of the support is so determined that the lowermost point of the back-wheel lies about 4 inches above the runners $b$. The support may be provided with a rearwardly projecting rigid contrivance $g$ for the reception of luggage, if the sledge-velocipede is to be used for transporting purposes.

On the underside of each pedal $k$, a funnel-shaped bracket $p$ with open rear end is fixed. Within each of said brackets a straight picker $o$ is pivotally mounted at $q$, so as to turn in a perpendicular plane thereon, the turning-movement of said pickers being limited by the upper and lower walls of said brackets, while the free ends of said pickers project in rearwardly and downwardly inclined direction from the open rear ends of said brackets.

During their free circular movement with the pedals, the pickers rest upon the lower walls of the brackets, while during their operation, for driving the velocipede forward, they rise to the upper walls of the brackets and fall then again down.

What we claim, is:—

In a sledge-velocipede, the combination with the velocipede-pedals, of funnel-shaped brackets with open rear end fixed to the underside of said pedals and located to participate in the circular movement of the latter, and straight pickers pivotally mounted in said brackets so as to turn in a perpendicular plane thereon, and projecting in rearwardly and downwardly inclined direction from the open rear ends of said brackets, the turning-movement of said pickers being limited by the upper and lower walls of said brackets, substantially as and for the purpose set forth.

In testimony whereof we have hereunto set our hands in the presence of two subscribing witnesses.

PRODROMOS MADJAROGLOU.
ANDREAS PAULICK.

Witnesses:
    M. HEIN,
    JOH HAGEN.